United States Patent [19]

Hampson et al.

[11] Patent Number: 4,493,989
[45] Date of Patent: Jan. 15, 1985

[54] CONTAINER END-CODE REDEMPTION SCANNING

[76] Inventors: Alfred A. Hampson, 2687 SW. Buena Vista Pl., Portland, Oreg. 97201; Thomas B. Hutchins, deceased, late of Portland, Oreg.; by Nancy K. Hutchins, executrix, 310 NW. Brynwood La., Portland, Oreg. 97229

[21] Appl. No.: 372,735

[22] Filed: Apr. 28, 1982

[51] Int. Cl.³ .............................................. G06K 7/10
[52] U.S. Cl. .................................... 235/464; 235/467
[58] Field of Search ................................ 235/464, 467

[56] References Cited

U.S. PATENT DOCUMENTS

| | | | |
|---|---|---|---|
| 3,474,234 | 10/1969 | Rieger | 235/464 |
| 3,585,366 | 6/1971 | Kern | 235/464 |
| 3,643,068 | 2/1972 | Mohan | 235/464 |
| 3,735,096 | 5/1973 | Knockeart | 235/464 |
| 3,770,940 | 11/1973 | Harr | 235/467 |
| 3,931,524 | 1/1976 | Herrin | 235/467 |
| 3,991,883 | 11/1976 | Hobler | 235/464 |
| 4,250,405 | 2/1981 | Ashcroft | 235/464 |

Primary Examiner—Harold I. Pitts
Attorney, Agent, or Firm—Kolisch, Hartwell, Dickinson & Anderson

[57] ABSTRACT

A method and apparatus for reading coded information formed on the lid of a carbonated beverage container. The coded information takes the form of spaced linear code elements, such as indentations, and reading of the information contained in the arrangement of these elements is accomplished through sweeping a laser beam over the elements. In most, but not all, cases, the linear code elements radiate from the axis of revolution of a lid, and the reading of information results from the production of relative rotary movement between the region of beam/lid impingement, and the elements. Preferably, this impingement region is elongated and linear in nature, and sweeps over such code elements in such a manner that, as it passes over each particular element, its long axis substantially coincides with the long axis of the element.

12 Claims, 6 Drawing Figures

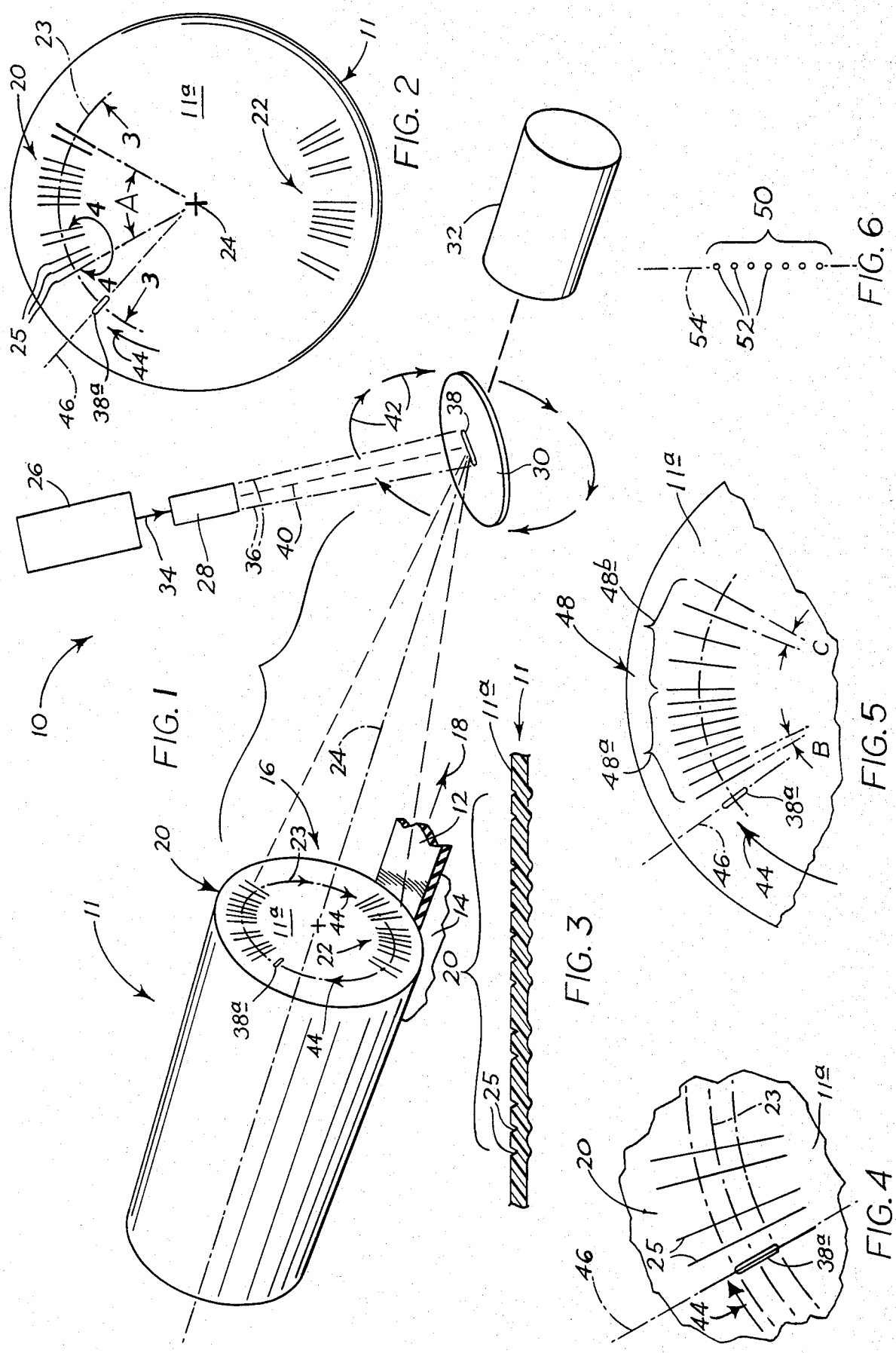

CONTAINER END-CODE REDEMPTION SCANNING

BACKGROUND AND SUMMARY OF THE INVENTION

This invention relates to the field of carbonated beverage containers, and more particular to a method and apparatus for reading coded information which is formed on the lid of such a container. The particular kind of coded information which is disclosed hereinbelow takes one of several different preferred forms—linear indentations, linear projecting ridges, and linear printed areas—all of which are readable using, according to the invention, electromagnetic-wave optics.

While, of course, different kinds of coded information can be placed on the lid of such a container, the invention is described herein in connection with so-called redemption information.

In recent years, several states have adopted mandatory deposit statutes under which carbonated beverage containers, such as cans, are required to "carry" a monetary deposit which is intended to promote return and recycling of a container after use. While such legislation has generally been quite successful in promoting return, it has also resulted in the usual redemption market outlets having to devote considerable space and time to redemption handling.

In light of the enormous redemption task brought about by such deposit statutes, much consideration has been given to the successful development and utilization of some sort of automatic redemption system, such as a can redemption system, which will offer high-speed, economical return handling. Among the important considerations relating to such a system are (1) its ability to determine that a returned can is properly redeemable in the particular state where the system is used, and (2) its ability to identify returned cans according to their different sources of origin.

In a companion patent application of ours, Ser. No. 353,365, filed Mar. 1, 1982, for "Redeemable Container With End Closure Redemption Code", we have proposed a unique lid structure which is usable in a container of the type generally mentioned above, and which carries an electromagnetic-wave-readable, regionally unique redemption code. Generally speaking, the type of code proposed therein takes the form of two arcuately displaced, optically readable code patches, in the nature of generally radially extending linear code elements whose particular arrangement pattern contains the desired coded information. Both binary-type and frequency-type codes are illustrated, in three different structures—one of which takes the form of linear indentations or valleys, another of which takes the form of linear projecting ridges, and a third of which takes the form of reflectance-contrasting printing. While radial disposition for the individual code elements is convenient, it is not absolutely necessary.

A general object of the present invention is to provide, for a beverage container of the kind generally indicated above, including a lid formed with coded information such as that just described, a unique method and apparatus for reading such encoded information.

Another object is to provide such a method and apparatus which are extremely simple and reliable.

According to the invention, the proposed scanning apparatus is provided with a scanning zone into which a beam of electromagnetic-wave radiation, such as a laser beam, is directed. Within the scanning zone, reading of coded information results from the production of relative rotary movement between the region of beam-lid impingement and the individual code elements on a lid exposed in the zone. Preferably, this impingement region is elongated and linear in nature, and sweeps over such code elements in such a manner that, as it passes over each particular element, its long axis substantially coincides with the long axis of the element. According to one form of the invention, the region of beam/lid impingement is continuous along its length; and according to another form, is discontinuous, and in the form of dots, along its length. Decoding of the information which is read is accomplished in a variety of conventional ways, as, for example, by viewing the intensity of radiation reflected over time from such a scanning operation, and feeding this data to digital decoding circuitry.

Various other features and advantages which are offered by the invention will become more fully apparent as the description which now follows is read in conjunction with the accompanying drawings.

DESCRIPTION OF THE DRAWINGS

FIG. 1 is a perspective view illustrating a carbonated beverage can on its side in a scanning zone, in a condition where coded information carried on the lid of the can is being scanned in accordance with the method and apparatus of the present invention.

FIG. 2 is an enlarged lid-end view of the can of FIG. 1.

FIG. 3 is a fragmentary, developed sectional view, on a larger scale than FIG. 2, illustrating a binary-code-format code patch which is being scanned in the arrangement of FIG. 1—this view being taken generally along curved line 3—3 in FIG. 2.

FIG. 4 is a fragmentary detail, on a larger scale than FIG. 2, taken generally in the area indicated by double-ended curved arrow 4—4 in FIG. 2, illustrating the long-axial coincidence of a region of beam-lid impingement and of one of the code elements in the code formed on the lid shown in FIGS. 1 and 2.

FIG. 5 is a fragmentary view, on a scale which is intermediate those of FIGS. 2 and 4, showing a frequency-type code format.

FIG. 6 is a pattern view illustrating a modified form of beam-lid impingement region, wherein the same is discontinuous, and in the form of dots.

DETAILED DESCRIPTION OF THE INVENTION

Turning now to the drawings, and referring first to FIG. 1, indicated generally at 10 is an apparatus constructed according to the invention for scanning and reading information from a code formed on the lid of a can which is shown generally at 11. Included in apparatus 10 are a conveyor belt, shown fragmentarily at 12, supported for travel on a suitable frame, shown fragmentarily at 14. Belt 12 and frame 14, at the locations shown therefore in FIG. 1, collectively define a scanning zone 16. Zone 16 forms part of a can-redemption machine, the other details of which are unimportant as far as an understanding of the present invention is concerned. Suffice it to say that this machine is constructed to receive returned cans, like can 11, and transport them into zone 16 for reading of redemption-code information on their lids, with subsequent delivery of the cans to another location in the machine for further redemption processing. In the particular machine employed herein, belt 14 transports cans 11 through the scanning zone generally in the direction of arrow 18.

Considering FIGS. 2 and 3 along with FIG. 1, formed in the outer face of the lid 11a in can 11 are two diametrally spaced, arcuately distributed code patches 20, 22. In lid 11a, patches 20, 22 are distributed, generally speaking, along the circular path shown in dashed-dot lines at 23. This patch is centered on the axis 24 of can 11. As will be explained, the information contained in these two code patches is identical, and is intended to provide for what is referred to herein as reading redundancy.

With attention placed on code patch 20, and now "reading" along the patch in a generally clockwise direction in FIGS. 1 and 2, and from left to right in FIG. 3, the patch includes a plurality of radially extending linear indentations, or valleys, such as those shown at 25. These indentations are also referred to herein as code elements. Progressing in the direction just mentioned through patch 20, one first encounters a group of three indentations, then a single blank space, then a pair of indentations, then another blank space, then six indentations, then another blank space, and finally two indentations. The code format used in patch 20 is a binary format, with the presence of an indentation representing a binary "1", and a blank space representing a binary "0". Thus, the binary code embodied in patch 20 is as follows: 1-1-1-0-1-1-0-1-1-1-1-1-1-0-1-1. While different particular dimensions may be used, the following dimensions characterize the construction and layout of patch 20. The patch occupies an arc of about 20°, indicated by angle A in FIG. 2, with each indentation having a length of about 0.875-inches, a width of 0.004-inches, and a depth of about 0.003-inches. The outer end of each indentation is spaced from the periphery of lid 11a by about 0.3-inches.

The particular binary code just described which is embodied in patch 20 is, of course, arbitrary herein merely for the purpose of explanation. However, it will be understood by those skilled in the art that such a code is readily capable of providing unique redemption information for a particular state, and for a particular producer of the product contained in can 11.

Returning for a moment to the matter of reading redundancy mentioned earlier, it will be noted that, as one progresses through code patch 22, in the same angular direction as through code patch 20, one encounters exactly the same code. Such redundancy, while not necessary in all instances, is convenient, and preferred, in the event that there is some defacing or other marring of the outer face of lid 11a which might prevent reading of the code in one of the patches.

As has been mentioned earlier, it is intended that the code formed in patches 20, 22 be readable through the use of electromagnetic radiation. The preferred method shown herein involves the action of a laser beam which is produced and directed toward a code patch to create a region of beam/lid impingement which is swept, relatively, through the code in the patch. While various kinds of relative sweeping are usable, depending upon the nature of the layout of code elements in a code patch, where, as here, such elements are laid out along radial lines, relative rotary sweeping is preferable. Such, of course, can be accomplished either through rotation alone of a can in zone 16 (about the can's long axis), rotational sweeping alone of a laser beam with the can stationary in the station, or rotary motion of both such a can and a beam. In apparatus 10, can 11 is stationary against rotation, and a laser beam is swept, as will be explained, to produce a circularly traveling region of beam/lid impingement.

Returning attention primarily to FIG. 1, and further considering the construction of apparatus 10, also included therein are a laser 26, an optical collimator 28, a rotatable mirror 30, and an electric motor 32 ganged to mirror 30 to rotate it, as will be explained, about an axis coincident with previously-mentioned axis 24. Laser 26 and collimator 28 collectively form what is referred to herein as beam-producing means. Mirror 30 and motor 32 constitute a beam-impingement sweep-effecting means.

Laser 26 is suitably offset from axis 24, as shown, in conventional in construction, and when energized, produces the laser beam having a generally circular cross-sectional area with a diameter of about 0.002-inches. This beam is directed, as indicated by arrow 34, toward collimator 28 which spreads the beam, as indicated by dash-dot lines 36, into a generally linear elongate beam having a width of about 0.002-inches and a length of about 0.1-inches. The region of impingement of this beam with the surface of mirror 30 is indicated generally at 38. The projection axis of spread-beam 36 is indicated by dashed line 40.

With operation of motor 32, mirror 30 rotates, in the direction of arrows 42, generally in a plane which is normal to axis 24, and which contains axis 40. The mirror is inclined with respect to axis 24 in such a manner that, as it so rotates, a mirrow-reflected image of beam 36 sweeps circularly in zone 16. In particular, the mirror position and orientation relative to beam 36 are adjusted so that, with a can like can 11 in the position shown for it in station 16, a reflected region of beam/lid impingement, such as that shown at 38a in FIGS. 1 and 2, sweeps circularly in the direction of arrows 44 along previously-mentioned circular path 23. Preferably, the longitudinal mid-point of impingement region 38a is substantially centered on path 23.

Considering FIG. 4 along with FIGS. 1 and 2, according to a feature of the invention, region 38a sweeps in such a manner that, when it "crosses over" a code element in a code patch, its long axis substantially coincides with the long axis of the element. Accordingly, the parts in apparatus 10 herein are so arranged that the long axis of region 38a is always disposed along a line which is substantially radial with respect to axis 24. This axis, for region 38a, is shown in dash-dot lines at 46 in FIGS. 2 and 4. In FIGS. 1 and 2, and assuming that a beam-sweeping operation is under way, beam/lid impingement region 38a is just "upstream" from code patch 20, and is moving toward it in the direction of arrow 44. In FIG. 4, region 38a is directly crossing the first-to-be encountered code element 25 in patch 20, and here, it will be seen how axis 46 substantially coincides with the long axis of the code element. Further, it will be noted in FIG. 4 that the overall length of region 38a is substantially one-third the overall length of elements 25, and, in an end-to-end sense, is substantially centered. This relative positioning and sizing is preferable for maximizing reading accuracy.

As region 38a sweeps over the elements in patch 20, reflections occur from lid 11a which are read, through any suitable conventional optical reading system, located generally in the area of mirror 30, to detect changes in reflectance that take place as the region sweeps through the patch. These reflectance changes are then decoded, conventionally, to provide the information contained in the patch. While different sweep rates may be used, one which has been found to be quite satisfactory is a sweep rate of about 1800-sweeps-per-minute.

Turning attention now to FIG. 5, here there is illustrated on can lid 11a a code patch 48 which is formed with a frequency-type code. Patch 48 includes one group 48a of radially extending linear indentations like indentations 25, which are uniformly angularly spaced by one preselected angle B, and another group 48b of similar indentations equally angularly spaced by an angle C which has substantially twice the value of angle B. Thus, the code contained in patch 48, when swept by beam/lid impingement region 38a will be read as a two-frequency code, with the indentations in group 48a producing one frequency response, and the indentations in group 48b producing another frequency response which is substantially one-half that of the first-mentioned frequency response.

With respect to each of the different kinds of code patches referred to so far, it should be understood that code elements therein, instead of taking the form of linear indentations or valleys, could just as well take the form of linear projecting ridges, or of linear printed material.

Finally, turning attention to FIG. 6, it has been noted that there may be certain applications wherein it is desired to develop a region of beam/lid impingement which, while elongated, is discontinuous, and in the form of dots, along its length. FIG. 6 illustrates, in an isolated fashion, such a beam/lid impingement region—generally designated by bracket 50. Region 50, as can be seen, takes the form of seven impingement beam dots, such as the dots shown at 52. Each dot has a generally circular cross-sectional area, with a diameter of about 0.002-inches. The overall length of the total arrangement of dots is about 0.1-inches. Dots 52 are linearly distributed along a line 54 (in FIG. 6). In terms of sweeping a region like region 50 over a code patch like those described earlier, line 54 coincides functionally with previously-mentioned line 46.

It will thus be appreciated that an extremely simple, efficient, and accurate scanning method and apparatus are proposed for extracting information, like redemption information, carried on the lid of a carbonated beverage container.

While a preferred method of practicing, and embodiment of, the invention have been disclosed herein, it is appreciated that variations and modifications may be made without departing from the spirit of the invention.

It is claimed and desired to secure by Letters Patent:

1. Apparatus for enabling scanning of, for the purpose of recovering information from, an electromagnetic-wave-readable code patch on the lid of a carbonated beverage container, where such patch is formed of plural, spaced, linear code elements having a predetermined length, said apparatus comprising means defining a scanning zone adapted to receive such a container with the lid thereof exposed for viewing, means disposed adjacent said scanning zone for producing a defined beam of electromagnetic radiation, and beam-impingement sweep-effecting means operatively interposed between said beam-producing means and any can in said zone for effecting impingement of the beam with the lid of such can, and relative rotary movement therebetween to cause the region of beam/lid impingement to sweep relatively and generally centrally over the elements in such a patch, the region of beam/lid impingement being elongated and linear in form with a length less than the predetermined length of the code elements, and moving relative to a lid viewable in said zone in such a manner that, while sweeping over a code element, the region's long axis substantially parallels the long axis of the element.

2. The apparatus of claim 1, wherein the region of beam/lid impingement is continuous along its length.

3. The apparatus of claim 1, wherein the region of beam/lid impingement is discontinuous, and in the form of dots, along its length.

4. Apparatus for enabling scanning of, for the purpose of recovering information from, an electromagnetic-wave-readable code patch on the lid of a carbonated beverage container, where such patch is formed of plural, arcuately spaced, linear, generally radially extending code elements having a predetermined length, said apparatus comprising means defining a scanning zone adapted to receive such a container with the lid thereof exposed for viewing, means disposed adjacent said scanning zone for producing a defined beam of electromagnetic radiation, and beam-impingement sweep-effecting means operatively interposed between said beam-producing means and any can in said zone for effecting impingement of the beam with the lid of such can, and relative rotary movement therebetween to cause the region of beam/lid impingement to sweep relatively and generally centrally over the elements in such a patch, the region of beam/lid impingement being elongated and linear in form with a length less than the predetermined length of the code elements, and moving relative to a lid viewable in said zone in such a manner that, while sweeping over a code element, the region's long axis substantially parallels the long axis of the element.

5. The apparatus of claim 4, wherein said beam-defining means creates a region of beam/lid impingement which is continuous along its length.

6. The apparatus of claim 4, wherein said beam-defining means creates a region of beam/lid impingement which is discontinuous, and in the form of dots, along its length.

7. A method of reading (in a reading zone) information recorded in an electromagnetic-wave-readable code patch carried on the lid of a carbonated beverage container, where said patch is formed of plural, spaced, generally linear code elements having a predetermined length, said method comprising producing a defined beam of electromagnetic radiation shaped in such a manner as to result in a beam/lid impingement region which is elongate and linear in form with a length less than the predetermined length of the code elements, directing such beam into such zone toward such a lid to impinge the latter, and while so directing the beam, creating relative movement between the lid and the region of impingement thereon of the beam to cause such region to sweep relatively and generally centrally over such code elements, with the region's long axis, as the region sweeps over an element, substantially paralleling the long axis of the element.

8. The method of claim 7, wherein said shaping results in a beam/lid impingement region which is continuous along its length.

9. The method of claim 7, wherein said shaping results in a beam/lid impingement region which is discontinuous, and in the form of dots, along its length.

10. A method of reading (in a reading zone) information recorded in an electromagnetic-wave-readable code patch carried on the lid of a carbonated beverage container, where such patch is formed of plural, arcuately spaced, linear, generally radially extending code elements having a predetermined length, said method comprising producing a defined beam of electromagnetic radiation, shaped in such a manner as to result in a beam/lid impingement region which is elongate and linear in form with a length less than the predetermined length of the code elements, directing such beam into such zone toward such a lid to impinge the latter, and while so directing the beam, creating relative rotary movement between the lid and the region of impingement thereon of the beam to cause such region to sweep relatively and generally centrally over such code elements, with the region's long axis, as the region sweeps over an element, substantially paralleling the long axis of the element.

11. The method of claim 10, wherein said shaping results in a beam/lid impingement region which is continuous along its length.

12. The method of claim 10, wherein said shaping results in a beam/lid impingement region which is discontinuous, and in the form of dots, along its length.

* * * * *